April 7, 1936.                    F. B. HALFORD                    2,036,936
VALVE GEAR FOR INTERNAL COMBUSTION ENGINES
Filed March 15, 1933
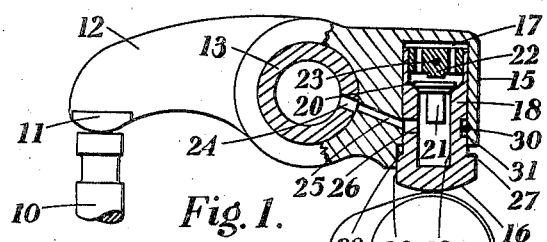
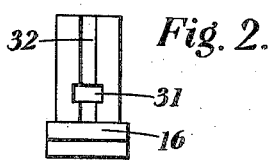
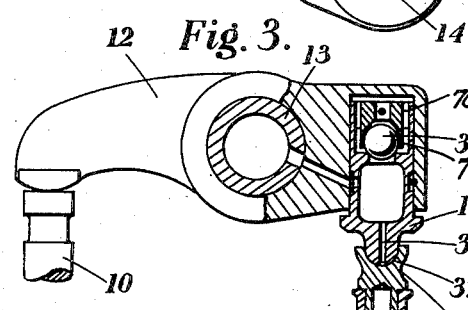
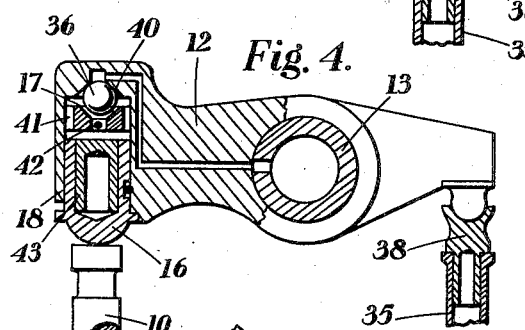
INVENTOR
Frank Bernard Halford
BY
ATTORNEY Patented Apr. 7, 1936

2,036,936

UNITED STATES PATENT OFFICE 2,036,936

VALVE GEAR FOR INTERNAL COMBUSTION ENGINES

Frank Bernard Halford, London, England

Application March 15, 1933, Serial No. 660,971
In Great Britain April 4, 1932

6 Claims. (Cl. 123—90)

The present invention relates to valve gear for internal combustion engines and in particular to valve operating mechanism of that type in which the operating thrust for operating the valves is transmitted through a column or pad of liquid confined in a space to which further liquid can be admitted so as to take up any clearance in the mechanism.

The present invention comprises self-adjusting valve operating mechanism for internal combustion engines in which the operating thrust is transmitted from one moving member to another through a column of liquid admitted past a non-return valve to and confined within a space bounded partly by one of such members and partly by the other, wherein the non-return valve is free to move under the action of gravity and inertia and is mounted upon a moving part of the mechanism in such orientation that during the acceleration of that part in the initial stage of raising an engine valve from its seating the inertia of the said non-return valve urges it on to its seating. By making the non-return valve free to move under the action of gravity and inertia instead of employing a valve urged on to its seating by a spring the oil pressure required to lift the valve when at rest can be substantially reduced. Moreover the force tending to seat the valve due to inertia when running at high speed is greater than if a spring of reasonable strength is relied upon. In a modern high speed engine the initial acceleration of the tappet may be so great that the force between the valve and its seat due to inertia may amount to two or three hundred times the weight of the valve itself. If a spring capable of providing such a force is provided it will be appreciated that a very considerable oil pressure is necessary in order to open the valve at all. According to the invention therefore the spring is completely omitted and the mass of the valve relied upon entirely. The valve may be of stout construction so that its weight will be considerable in relation to frictional and other forces acting on it, for example it may be in the form of a ball or a short stout mushroom valve.

In one form of the invention the operating thrust is transmitted through a column of liquid from one moving member to another, of which members one is a socket member formed with a cylindrical recess into which the other, a plug member, fits, and in which the liquid is confined and to which it is admitted by a non-return valve, and the non-return valve is free to move under the action of gravity and inertia and is carried by one of the aforesaid members.

Moreover in one form of the invention the mechanism comprises a rocker arm, and one of these interengaging members is formed integral with the rocker arm which has a passage through it through which liquid is supplied to the column from the rocker shaft.

In order to minimize the possibility of leakage through the non-return valve owing to dirt or the like holding it off its seating it may be made to engage its seating with approximately line contact, for example such as would be obtained with a ball valve seated on a sharp edged hole.

A stop is preferably provided to limit the travel of the non-return valve away from its seating to a very small distance. This may be of the order of five thousandths of an inch in the case of a ball valve of three-sixteenths of an inch diameter, that is to say, not materially greater than the clearance which is normally required between the end of the engine valve and its operating mechanism when the valve is closed if no automatic adjusting means is provided. In this way the time occupied by the non-return valve in closing can be made extremely short, a desirable feature since otherwise the lift of the engine valve is shortened and its opening delayed.

In a convenient compact construction the non-return valve and its seating are situated within the plug member. In order to enable the engine to start and the valves to function should the oil pressure fail or before the oil pressure is established a stop is preferably provided serving to limit the extent to which the plug member can slide into the recess and means (for example shims) for adjusting the effective position of such stop. This enables the valves to operate, although there will be some clearance unless or until the oil pressure is established.

A stop is also preferably provided to limit the extent to which the plug member can slide out from the recess and conveniently the same stop may serve to prevent rotation of the plug in the recess.

The plug may be formed with a flat or clearance on the outside of a part of it which slides in the recess to permit the escape from the inner end of the recess of any air that may become trapped there. An oil passage for conducting lubricant to the parts such as the cam which require lubrication may also be afforded branching from the supply to the recess and having a metering portion extending between opposed walls of a moving member and the recess in which it slides by forming a flat or clearance between these walls of suitable dimensions to meter such supply of oil.

It is to be noted that the improved construction makes it possible to reduce to only a small volume of oil which is trapped between the end of the plug and the end of the recess in order to form the pad of variable thickness between these parts. In this way the cushioning effect due to any small bubbles of air imprisoned in the oil pad is reduced to a minimum. Where the valve is carried in the plug, the stop member which limits the lift of the valve off its seat may be so constructed as to take up a considerable volume of the hollow space in the end of the plug beyond the valve. Where the valve is carried in the recess, the stop member is formed to take up an appreciable amount of the volumetric space, while the plug, though conveniently formed hollow for the purpose of saving weight, may have its inner end closed in some convenient manner.

To enable the invention to be carried into effect some specific examples of it are shown in the accompanying drawing, in which Figure 1 is a more or less diagrammatic view mostly in section of one arrangement, Figure 2 is a view of the plug of Figure 1, removed from the rocker, Figures 3 to 6 are views similar to Figure 1 of modified arrangements, and Figure 7 is an enlarged view mostly in section of the tappet end of a rocker embodying a further modification of the invention.

Like reference numerals indicate like parts throughout the drawing.

Figure 1 shows the end 10 of a valve stem operated by one end 11 of a rocker 12 mounted on a hollow shaft 13. A cam 14 engages the other end 15 of the rocker through the medium of a tappet or plug 16. The latter is received in a recess 17 in the end of the rocker and comprises a cylindrical body 18 with a central bore 19 enlarged at its open end to form a seating 20 for a poppet valve 21 of mushroom shape. Movement of the poppet valve off its seating is limited by a stop 22 in the form of a spider or perforated disc partially closing the open end of the plug and held in position by a pin 23. Oil is delivered through the hollow rocker shaft from which it passes through a lateral hole 24 registering with a passage 25 through the rocker arm and through a port 26 in the wall of the plug into the central bore in the plug.

Thus if a pressure of the order of ten pounds per square inch is maintained in the shaft oil will be forced into the interior of the plug 16 and past the non-return valve into the recess 17 whenever there is any clearance between the cam and the plug, but immediately the plug starts to rise for the initial movement of raising the engine valve the non-return valve will be pressed by inertia on to its seat and any return of the oil prevented.

The lower end of the plug is formed with a head. Between this head and the opposed surface of the rocker annular or horseshoe-shaped shims 27 may be placed around the cylindrical part of the plug to limit the extent to which the plug can be pushed into the recess unless or until the oil pressure is established. The shims can be chosen so as to provide an appropriate clearance under these circumstances. In order to prevent rotation of the plug in the recess and to maintain the port 26 in register with the passage 25, the head 16 of the plug is flattened on one side at 28 to engage a shoulder 29 on the rocker. In order to limit movement of the plug in a direction out of the recess, for example in case a valve spring should break, a pin 30 is inserted through the end of the rocker and registers with a flat 31 formed in the side of the plug.

In order to permit the escape of any air that might become entrapped in the recess the side of the plug is provided with a flat 32 (seen in Figure 2) extending from its upper face to its head.

The construction shown in Figure 3 is in general similar to that shown in Figure 1. In this case however the rocker is operated by a push rod 35 instead of directly by a cam and the non-return valve 21 is replaced by a ball 36. As will be clear from the drawing, the stop member 70 which limits the lift of the valve off its seat is formed with projecting fingers 71 which serve to guide the ball valve and prevent any substantial lateral movement thereof. The plug 16 is formed with a ball-shaped end 37 to engage the replaceable cup-shaped end 38 to the push rod and has in it a passage 39 communicating with the interior of the plug to lubricate the surface of engagement between these parts.

In the construction shown in Figure 4 the means for taking up clearance is situated at the opposite end of the rocker, that is to say, between the rocker and the end of the valve stem. In these circumstances the seating of the non-return valve must be arranged above it (if the engine valve opens downwardly) in order that the inertia due to acceleration as the engine valve begins to open may urge the valve on to its seating. Thus in this case the valve 36 has a seating 40 in the end of the recess 17 and its movement is limited by a spider 41 which is held in the recess by a pin 42. The plug member 16 may then be formed as a solid cylinder but for the sake of lightness it is shown as hollow with the end filled by a cup-shaped plug 43.

As will be seen in the drawing, the ball 36 is confined between the conical valve seating surface 40 and an opposed conical surface afforded by the stop member 41. Thus the stop member engages the ball at points round a circle spaced from the seating by a distance less than the diameter of the ball. In this way, the permitted lateral travel of the ball is limited to a distance of the same order as the permitted lift of the valve.

Figure 5 shows the invention applied to a straight tappet between a push rod or valve and a cam. The tappet slides in a liner 45 mounted in the frame 46 and consists of a hollow sleeve 47 having in it a cylindrical recess in the upper end of which slides a plug member 48. In the lower part of this recess is mounted a cup member 49 with its open end directed upwards and forming a seating for the non-return ball valve 36. As in Figure 4, the ball is confined between its seat and a combined stop and guide 41 which not only limits its movement off its seating but also limits its lateral movement. The upper end of the cup is formed as a head fitting closely within the walls of the recess and engaging a slight shoulder formed by a diminution of the bore of the recess. Oil is admitted to the interior of the cup through a passage 50 extending through the liner and registering, when the tappet is in its lowest position, with a port 51 in the wall of the sleeve 47. The port 51 registers with an annular recess 52 encircling the cup 49 from which holes 53 lead to the interior of the cup. A slight clearance is provided between the lower part of the cup and the walls of the recess in the sleeve 47 so as to meter an oil feed to the lower part of the recess. From this space the oil passes through a passage 54 on to the interengaging faces of the tappet and cam.

The cam 55, as indicated by the dotted lines, is formed so as to allow the tappet to drop below what would normally be its lowermost position. The purpose of this is to provide a quick rise to close the non-return valve smartly. At the same time the engine valve is allowed to have its full lift and to close with a moderate or zero velocity.

In order to prevent rotation of the sleeve 47 its lower end is formed with a square head 64 to engage one or more guides 65 projecting down from the lower end of the liner 45.

In the construction shown in Figure 6 the two members between which the column of oil is confined are not formed one within the other but both slide in the liner 45. In this case the ball valve is shown as seating on a shoulder formed by an enlargement of the bore in the lower tappet member 56. Its upward movement is limited by a cross pin 57. In this case the oil fed through the port 51 leads directly to the interior of the tappet member 56. The passage 54 for the oil feed is omitted and instead the tappet is encircled by an annular recess 58 registering with the port 51 which is connected by a small metering flat 59 with a passage 60 leading to the interengaging faces of the tappet and cam. Thus the feed of oil to these faces is controlled by the flat 59 between the outer face of the tappet and the recess in which it slides.

In the construction shown in Figure 7 the arrangement of the ball valve is similar to that shown in Figure 3 but the tappet is intended as in Figure 1 to engage a cam directly. As in Figure 3, the ball is guided by fingers 71 afforded by a combined guide and stop 70 which serves to prevent substantial lateral movement of the valve and also to limit its lift. The lubricating arrangement for the face of the tappet differs from that of Figure 3 and comprises a passage 61 through the wall of the plug on the side opposite the port 26. From this a flat 62 on the outside of the plug forms a metering passage to a passage 63 leading to the face of the tappet.

In each construction it will be seen that the supply of oil is only open when the tappet is on the base circle of the cam and is closed owing to the arrangement of the ports (24, 25 or 50, 51) as soon as the parts move to lift an engine valve. Thus no additional oil can be admitted when the nose of the cam reaches the tappet and valve-bounce is most likely to occur and the force holding the non-return valve on its seating is reduced by the retardation effect of the engine valve gear.

In each case the lift of the valve is preferably limited to an amount of the order of five thousandths of an inch in the case of a normal engine. As is well known, this is the order of the clearance which normally exists in the valve mechanism of an automobile engine when cold. For larger engines or for aircraft work where a larger clearance would normally be permissible in the engine valve operating mechanism, a larger lift of the non-return valve will also normally be permissible.

Moreover, in each case the lateral movement of the ball valve is limited to a distance of a similar order. In certain cases, as shown in Figures 3 and 7, this may be effected by parallel guide fingers.

Alternatively, as shown in Figures 4 and 5, the stop which limits the lift of the valve may engage the ball at points round a circle which is spaced from the seating by a distance less than the diameter of the valve. In any case, if, as indicated in all the constructions employing a ball valve, the permitted lift is less than the amount by which the valve protrudes below the plane of its seating when in contact therewith, the valve cannot escape laterally from between the stop and the seating and hence its lateral movement will be limited in this way.

It will be appreciated that if an engine is running at, say, 3,000 R. P. M. a complete stroke occupies only one hundredth of a second so that the time available for the non-return valve to close as a preliminary to the commencement of the opening of the engine valve is extremely short. It is therefore of the greatest importance that the non-return valve should close promptly without any possibility of bouncing from its seating or descending on one side only of its seating. This is insured by the improved features described herein and set forth in the appended claims.

What I claim as my invention and desire to secure by Letters Patent is:—

1. Self-adjusting valve operating mechanism for internal combustion engines comprising in combination two moving and relatively movable members, a cylindrical chamber bounded at one end by one such member and at the other end by the other, a non-return valve mounted coaxially within said chamber for admitting thereto and confining therein a column of liquid under pressure by which the whole operating thrust is transmitted from one moving member to the other, said non-return valve being unrestrained and free to move under the action of gravity, inertia and fluid pressure alone and being mounted on one of said members in such orientation that in the initial stages of raising an engine valve the inertia of the non-return valve urges it on to its seating, and means to limit the lift of the non-return valve to a distance not materially greater than the required clearance in the engine valve operating mechanism.

2. Self-adjusting valve operating mechanism for internal combustion engines comprising in combination a socket member with a cylindrical recess, a plug member fitting in said recess, a recess in said plug member having a seating therein, a non-return valve within said plug member and cooperating with said seating for admitting to and confining in the recess in the socket member a column of liquid by which the operating thrust is transmitted from one member to the other, and a guide member fitting into the recess in the plug and formed so as to guide the non-return valve towards and away from its seating, to limit the lift of the non-return valve to a distance not materially greater than the required clearance in the engine valve operating mechanism, and to fill up the recess in the plug except for at least one narrow passage for the flow of liquid into the space between the ends of the plug and the recess in the socket, the said non-return valve being unrestrained and free to move under the action of gravity, inertia and fluid pressure alone and being mounted in such orientation that in the initial stages of raising an engine valve the inertia of the non-return valve urges it on to its seating.

3. Self-adjusting valve operating mechanism for internal combustion engines comprising in combination a rocker arm having in it a cylindrical recess, a plug member fitting into said recess, a non-return valve mounted coaxially within said recess for admitting thereto and confining therein a column of liquid by which the whole operating thrust is transmitted between the rocker arm and the plug member, said non-return valve being unrestrained and free to move under the action of gravity, inertia and fluid pressure alone and being mounted in such orientation that in the initial stages of raising an engine valve the inertia of the non-return valve urges it on to its seating, and means to limit the lift of the non-return valve to a distance not materially greater than the required clearance in the engine valve operating mechanism.

4. Self-adjusting valve operating mechanism for internal combustion engines comprising in combination a rocker arm having in it a cylindrical recess, a plug member fitting in said recess, a recess in said plug member having a seating therein, a non-return valve within said plug member and cooperating with said seating for admitting to and confining in the recess in the socket member a column of liquid by which the operating thrust is transmitted between the rocker arm and the plug member, and a guide member fitting into the recess in the plug and formed so as to guide the non-return valve towards and away from its seating, to limit the lift of the non-return valve to a distance not materially greater than the required clearance in the engine valve operating mechanism, and to fill up the recess in the plug except for at least one narrow passage for the flow of liquid into the space between the ends of the recess in the rocker and the plug, the said non-return valve being unrestrained and free to move under the action of gravity and its inertia alone and being mounted in such orientation that in the initial stages of raising an engine valve the inertia of the non-return valve urges it on to its seating.

5. Self-adjusting valve-operating mechanism for an internal combustion engine comprising in combination two moving and relatively movable members, a cylindrical chamber bounded at one end by one such member and at the other end by the other, a non-return valve serving to admit to the chamber and confine therein a column of liquid by which the operating thrust is transmitted from one member to the other, and means to limit the movement of the non-return valve both laterally and off its seating to a distance not materially greater than the required clearance in the engine valve operating mechanism, the non-return valve being otherwise unrestrained and free to move under the action of gravity, inertia and fluid pressure only and being mounted in such orientation that in the initial stages of raising an engine valve the inertia of the non-return valve urges it on to its seating.

6. Self-adjusting valve-operating mechanism for an internal combustion engine comprising in combination a socket member with a cylindrical recess in it, a plug member slidably fitting in said recess, a rocker arm carrying one of said members, a non-return valve serving to admit to the recess and to confine therein a column of liquid by which the operating thrust is transmitted from one member to the other, and means to limit the movement of the non-return valve both laterally and off its seating to a distance not materially greater than the required clearance in the engine valve operating mechanism, the non-return valve being otherwise unrestrained and free to move under the action of gravity, inertia and fluid pressure only and being mounted in such orientation that in the initial stages of raising an engine valve the inertia of the non-return valve urges it on to its seating.

FRANK BERNARD HALFORD.